United States Patent [19]
Rigazzi

[11] Patent Number: 5,893,343
[45] Date of Patent: Apr. 13, 1999

[54] LINEAR ELECTRICAL ENERGY GENERATOR

[76] Inventor: Pier Andrea Rigazzi, 42, contrada San Marco, CH-6982 Agno, Switzerland

[21] Appl. No.: 08/737,787

[22] PCT Filed: May 31, 1995

[86] PCT No.: PCT/EP95/02054

§ 371 Date: Nov. 25, 1996

§ 102(e) Date: Nov. 25, 1996

[87] PCT Pub. No.: WO95/33921

PCT Pub. Date: Dec. 14, 1995

[30] Foreign Application Priority Data

| Jun. 9, 1994 | [CH] | Switzerland | 1810/94 |
| Jun. 14, 1994 | [CH] | Switzerland | 1867/94 |
| Sep. 22, 1994 | [CH] | Switzerland | 2876/94 |
| Nov. 4, 1994 | [CH] | Switzerland | 3287/94 |
| Nov. 7, 1994 | [CH] | Switzerland | 3328/94 |
| Nov. 11, 1994 | [CH] | Switzerland | 3385/94 |
| Feb. 7, 1995 | [CH] | Switzerland | 336/95 |

[51] Int. Cl.$^6$ ............................... F02B 71/04
[52] U.S. Cl. ............................... 123/46 E
[58] Field of Search ............... 123/46 E, 257

[56] References Cited

U.S. PATENT DOCUMENTS

| 2,900,966 | 8/1959 | Brueder | 123/257 |
| 3,675,031 | 7/1972 | Lavigne | 123/46 E |
| 3,766,399 | 10/1973 | Demetrescu | 123/46 E |
| 4,403,153 | 9/1983 | Vallon | 123/46 E |
| 4,484,082 | 11/1984 | Bucknam | 123/46 E |
| 5,002,020 | 3/1991 | Kos | 123/46 E |
| 5,540,193 | 7/1996 | Achten et al. | 123/46 E |

Primary Examiner—Marguerite McMahon
Attorney, Agent, or Firm—Young & Thompson

[57] ABSTRACT

In an autogenous generator (1) in which electrical energy is generated by a linkage between fixed windings (2) and permanent magnets which move integrally on the alternating motion of one or more pistons of a two-stroke internal combustion engine, the cylinders (5) coupled to the pistons (4) have a conical precombustion chamber (10) opening towards the cylinders (5), the engine runs with variable compression strokes, and the magnets (3) and windings (2) are designed such that the ratio between the quantities of mechanical energy used to generate electrical energy for two different strokes of the magnets (3) is equal to the ratio between the two compression ratios obtained in the cylinders (5) in relation to the two different strokes performed by the pistons (4) integral with the said magnets (3) multiplied by the ratio between the two overall efficiency values of the engine in relation to the said compression ratios.

18 Claims, 9 Drawing Sheets

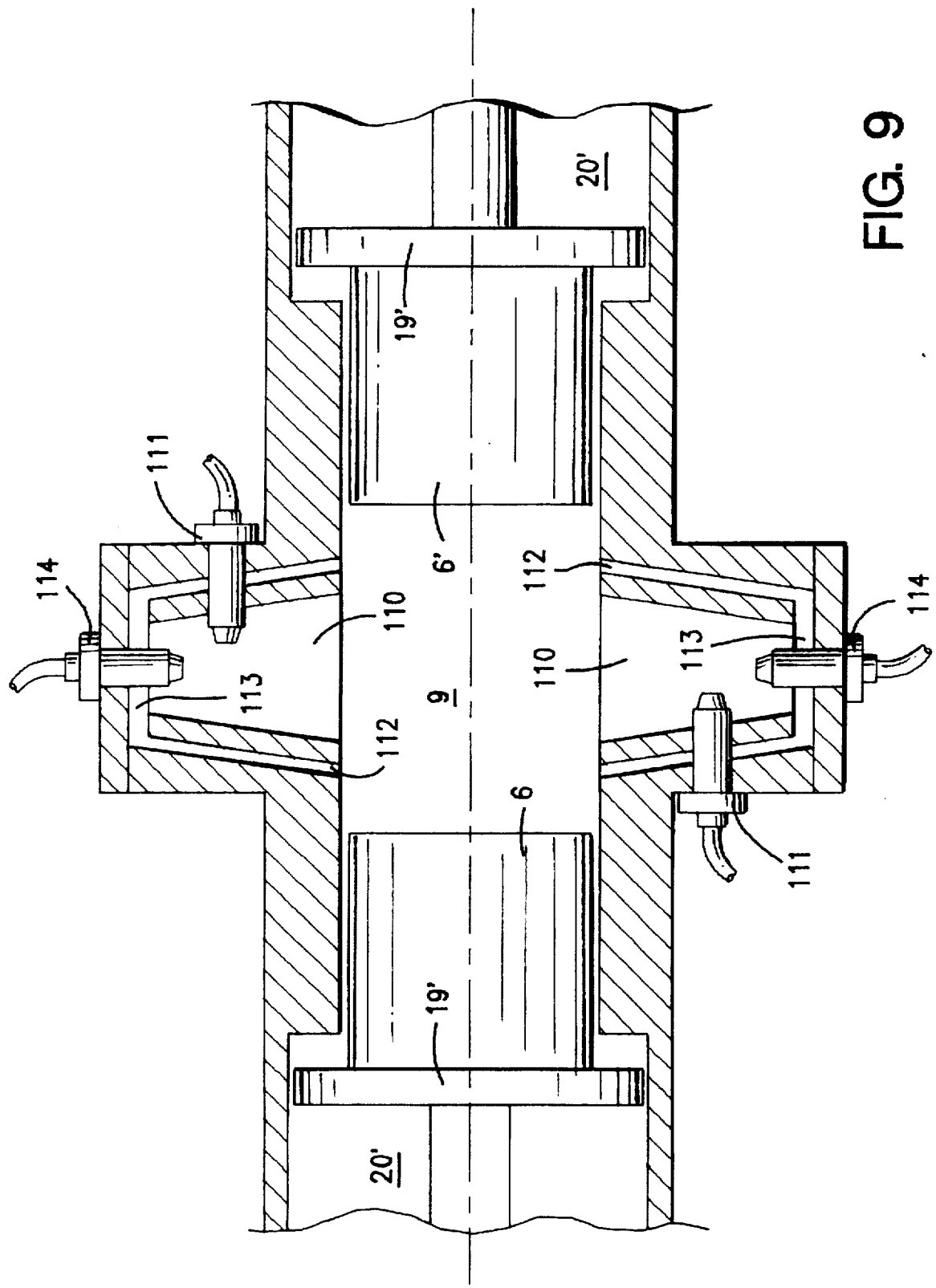

LINEAR ELECTRICAL ENERGY GENERATOR

BACKGROUND OF THE INVENTION

The present invention concerns the autogenous electrical energy generator sector, and more particularly generators in which the mechanical energy supplied by the alternating movement of pistons in an internal combustion engine without a crankshaft is transformed into an electrical current by the interaction of permanent magnets, integral with the aforesaid pistons, with fixed windings which are immersed cyclically in the magnet's magnetic field.

This type of generator is suitable for the production of electrical current which can then be used either directly, for example, for lighting or heating, as well as indirectly to supply electric motors that can be used for different types of locomotion on land, water, in the air or for other applications.

In any use, the generator is required to provide good performance in terms of output and adjustment with minimum environmental and noise pollution.

DESCRIPTION OF THE RELATED ART

Examples already known of this type of generator have considerable limitations in terms of the requirements mentioned above. A significant example is given in the generator covered by patent application GB 2 219 671A. With this generator, the production of electrical energy is achieved by means of the alternating motion of magnets with respect to fixed windings, with magnets integral with the pistons of an internal combustion engine without a crankshaft. However, in terms of arrangement of parts and the design of these parts, this prior art generator differs substantially from that of the present invention described below. For example, the magnets oscillate when moving with respect to a fixed point which lies essentially on the median transverse section plane of the system comprising the windings, and, in addition, the fixed windings can also be used alternatively to produce electrical energy that can be utilized outside the generator or to consume electrical energy to eject the aforesaid magnets to enable the return travel of compression of the piston. Additionally, the dimensions of the prior art device, in line with the energy supplied, is much greater than that needed for a generator as per this invention, in which electrical energy is produced both when the magnets enter the windings and when these return in the opposite direction, and in which start-up and regulation of the system can be done simply by modifying the amount of fuel per cycle.

General regulation of the device in the GB patent, however, both in the internal combustion part and the electromagnetic part, is extremely complicated and expensive to achieve as the pressure and amount of air admitted, quantity of fuel, and characteristic values correlated to the current circulating in the windings (impedance, resistance, direction, etc.) have to be controlled electronically, cycle by cycle.

Regulation of the quantity of air admitted, for example, which in the case of petrol combustion has to be calibrated approximately by stoichiometric measurement for both two-stroke and four-stroke engines, should be carried out independently of the above electrical values, acting on the admission of petrol and the air admission shut-off valves. The electrical values in questions should then be adjusted in turn, cycle by cycle, in accordance with the effects of the initial adjustment just described. This means that a proper computer facility has to be available to store and interpolate a large volume of data, which makes the equipment both costly and sensitive.

The functional layout of the internal combustion engine, apart from the absence of a crankshaft, is essentially conventional in type, and hence the aim is to achieve good overall efficiency by maximizing the energy per cycle to obtain the high temperatures and pressures required.

While this is understandable strictly from the point of view of energy alone, it is not so with regard to pollution in that it is virtually impossible to prevent the formation of toxic compounds such as nitrous oxide and carbon monoxide as the system runs as stated on an essentially stoichiometric mixture at high temperatures inside the cylinder.

Another similar example of a linear generator consists of a Jarrett engine. While control of the "return" of the piston under compression by means of electric current presents less of a problem, there are all the other aforementioned disadvantages. Additionally, in order not to further increase losses that are already high, fresh air for the cycle is admitted into the cylinder by acoustic resonance. This can only be achieved within a restricted cycle frequency range. Also, this type of engine is started virtually electrically and then used with a largely fixed, very high compression ratio of the order of 26:1, which means that it is only really suitable for use with naphtha as a fuel and for operation at very high fixed speeds, with the need to disperse some of the heat by cooling, and problems with particulates, etc.

SUMMARY OF THE INVENTION

The inventor of the present invention came to the conclusion that in order to simultaneously resolve the problems of product pollution, design complications, the need to use intermediate accumulator batteries, the poor regulation capability and low efficiency, a generator was needed in which the electromagnetic part and the internal combustion part would together form a functional unit, fully integrated in itself, so that movement with variable piston strokes would result in the quantity of mechanical energy produced by the internal combustion part corresponding exactly to the quantity of energy absorbed by the electromagnetic part to produce electric current, for any stroke, due to the law of thermodynamics, combustion of gases and electromagnetism.

Based on this concept, using one or more precombustion chambers in addition to the actual cylinders, an ultra-simple unit was achieved that could be controlled electronically, primarily by controlling only (1) the quantity of fuel admitted in one cycle and (2) the end of compression position of the piston or pistons. All this was achieved, as will be described in further detail below, at very low maximum, medium and minimum temperatures of the employed thermodynamic cycles (about half that of the usual values for an internal combustion engine) , and hence virtually zero pollution, and with very high overall efficiency of the internal combustion part at all operation speeds.

Based on the above, the inventor devised the present invention which concerns an autogenous electrical energy generator in which energy generation is achieved by a linkage between an electromagnetic system comprising fixed windings linked to one or more permanent magnets which move integrally on the alternating motion of one or more pistons of a two-stroke internal combustion engine, that can run with variable compression strokes, each piston completing one expansion stroke due to combustion and expansion in the cylinder, and one compression stroke due to the effect of the action of a component to return mechanical energy, characterized by the characterizing portion of appended claim 1.

BRIEF DESCRIPTION OF THE DRAWINGS

The advantages mentioned earlier will become evident in the detailed description of the generator given below, with reference to the attached drawings, as follows:

FIG. 9 shows a type of precombustion chamber of a truncated cone shape with two injector nozzles.

DESCRIPTION OF THE PREFERRED EMBODIMENTS

Figure 1:
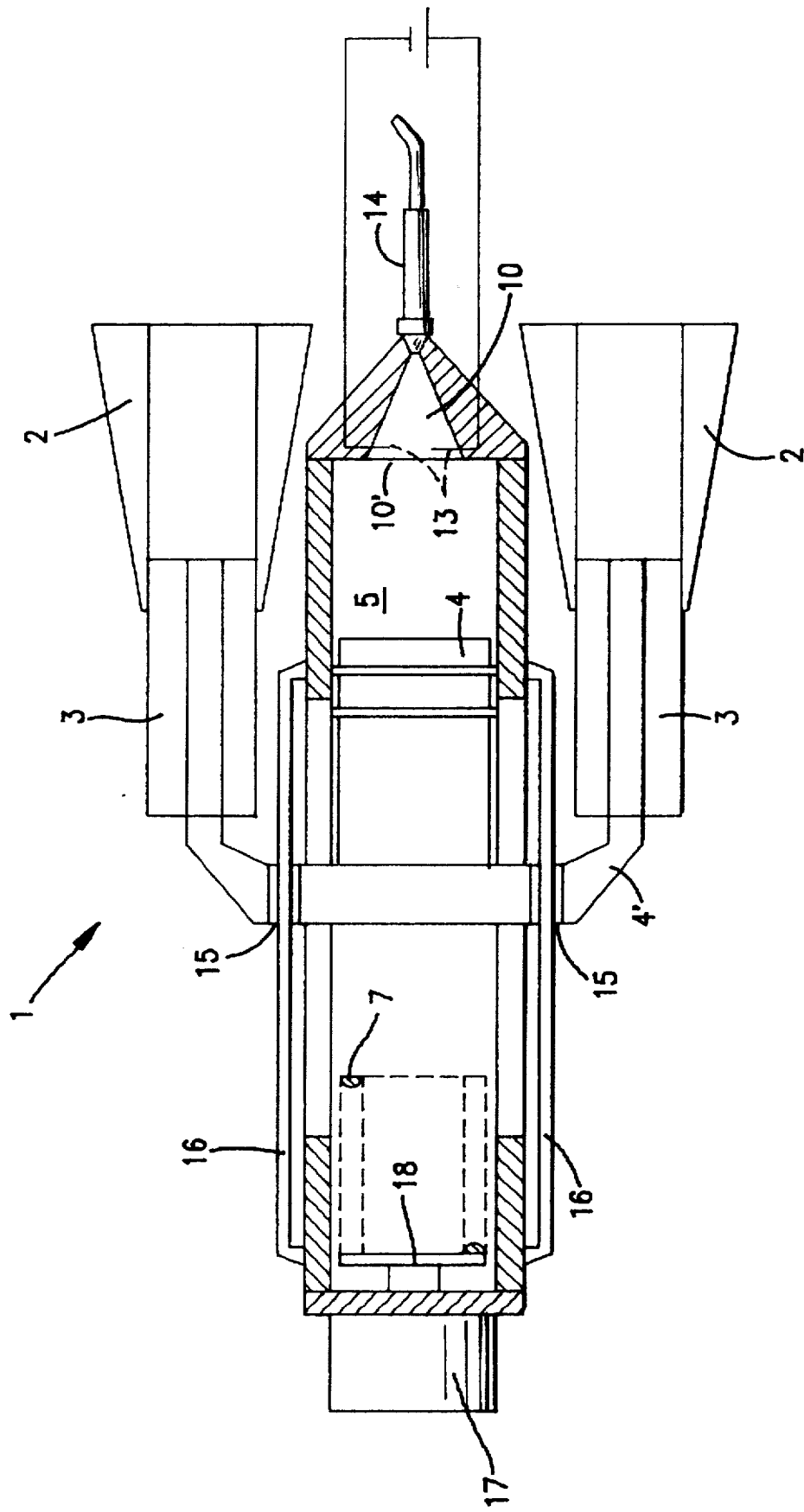
FIG. 1 is a longitudinal schematic section of one example of construction of a single cylinder two-stroke generator as per the invention.

FIG. 1 shows a generator in which the magnets 3 and fixed windings 2 are positioned such that there is a reduction in their linkage as the expansion stroke of piston 4 progresses but an increase in linkage as the compression stroke of the said piston 4 progresses. Other constructions are, however, possible in which the parts are assembled such that the opposite occurs, i.e. in which the linkage between the magnets 3 and the windings 2 increases as the expansion stroke progresses and vice versa.

The generator consists of a cylinder 5 in which a piston 4 runs (FIG. 1) with two identical systems of magnets 3 arranged symmetrically with respect to the cylinder axis integral with it by means of a fork 4'. These magnets 3 are immersed in cycles in the compression and expansion strokes performed by the piston 4 within two systems of fixed windings 2, which are likewise identical and symmetrical. This immersion varies in degree depending on the length of the said stroke.

As the compression stroke progresses, as stated, the linkage between the magnets 3 and associated windings 2 increases, and conversely reduces in line with progress of the expansion stroke.

Movement of the piston 4 is caused in one direction by expansion of the compressed gas combined with the effect of fuel combustion, and in the other direction by the action of a system designed to return to mechanical energy. For example, one or more torsion springs or another system, including electromagnetic systems of a known type which use electrical energy to return mechanical energy to the piston may be utilized.

Fuel is admitted via an injector nozzle 14, atomized so that it saturates, approximately stoichiometrically, at least part of the volume of air contained in a precombustion chamber 10 that is substantially conical in shape with a base 10' which opens towards the cylinder 5.

The piston/magnet assembly is supported by two rolling (or sliding) friction systems 15, 16 which may be fixed to the body of the said cylinder 5, and which enable it to perform strokes a described above with minimum mechanical losses.

With continued reference to FIG. 1, in which the generator is a two-stroke engine shown in the inactive position, it is easy to describe its operation. To start the engine, all that is required is to inject a preset quantity of duly fuel into the precombustion chamber 10 and only for the start cycle, into the cylinder 5, and create a spark between the electrodes 13 positioned close to the base 10' of the cone forming the precombustion chamber 10.

The "explosion" of the air/fuel mixture projects the piston/magnet assembly towards the said springs 7, compressing them, and these springs then re-expand to return the same quantity of "absorbed" kinetic energy, so that the piston 4 completes a given return compression stroke.

The extent of this compression stroke depends on the kinetic energy acquired by the piston 4 following the initial "explosion", from which the quantities of energy that are transformed into electrical energy in the windings 2 in the stroke paths in both directions as well as the various losses are deducted.

The resultant residual kinetic energy of piston 4 then converts into a compression stroke of specific length.

At the end of this compression process, the density, and hence the mass of air contained inside the precombustion chamber 10, will have increased to an extent corresponding to the compression value obtained, and a quantity of petrol equivalent to or slightly more than the corresponding stoichiometric quantity should then be injected by means of injector nozzle 14. This fuel will then be ignited with the electrodes 13. If the electromagnetic system is designed and constructed in accordance with the invention, i.e. such that, for the compression stroke and for the associated piston speed curve, which increases with compression, the mechanical energy absorbed by the said electromagnetic system to produce electrical energy in the forward and return stroke of the piston 4 will be exactly equal to the energy generated in the combustion cycle (net of output). As a result, the piston 4 will complete one expansion stroke plus one return compression stroke stopping at exactly the same point as before with no change in compression ratio.

By injecting the same quantity of fuel for an indefinite number of cycles, the operation of the generator under steady-state conditions is obtained.

To increase the electrical energy produced in a cycle, it is only a matter of increasing, by a predetermined amount, the quantity of fuel injected into the precombustion chamber 10.

The increase in energy produced by combustion compared with the last cycle under steady-state conditions is divided between an increase in the quantity of electrical energy produced and an increase in the compression ratio. This establishes a new value that is again dependent solely on the new position adopted by piston 4 at the end of compression. The quantity of fuel appropriate to the greater mass of air contained in the precombustion chamber 10 should then be injected to adapt to the new conditions, and steady-state operation will be realized under the new conditions. Steady-state operation for this new compression stroke and for the relative speed curve for the piston 4, requires the energy absorbed by the electromagnetic system (i.e. the quantity of electrical energy generated in the cycle divided by the electromagnetic efficiency) is exactly the same as the new value of energy supplied by combustion under the new conditions. The same applies for deceleration and a reduction in piston stroke, although in this case the quantity of petrol per cycle should be reduced instead of increased.

The inventor recommends increasing saturation of air in the precombustion chamber 10, under steady-state conditions, by about 20% compared with the exact stoichiometric value, i.e. and air/petrol weight ratio 12.2.

Figure 5:
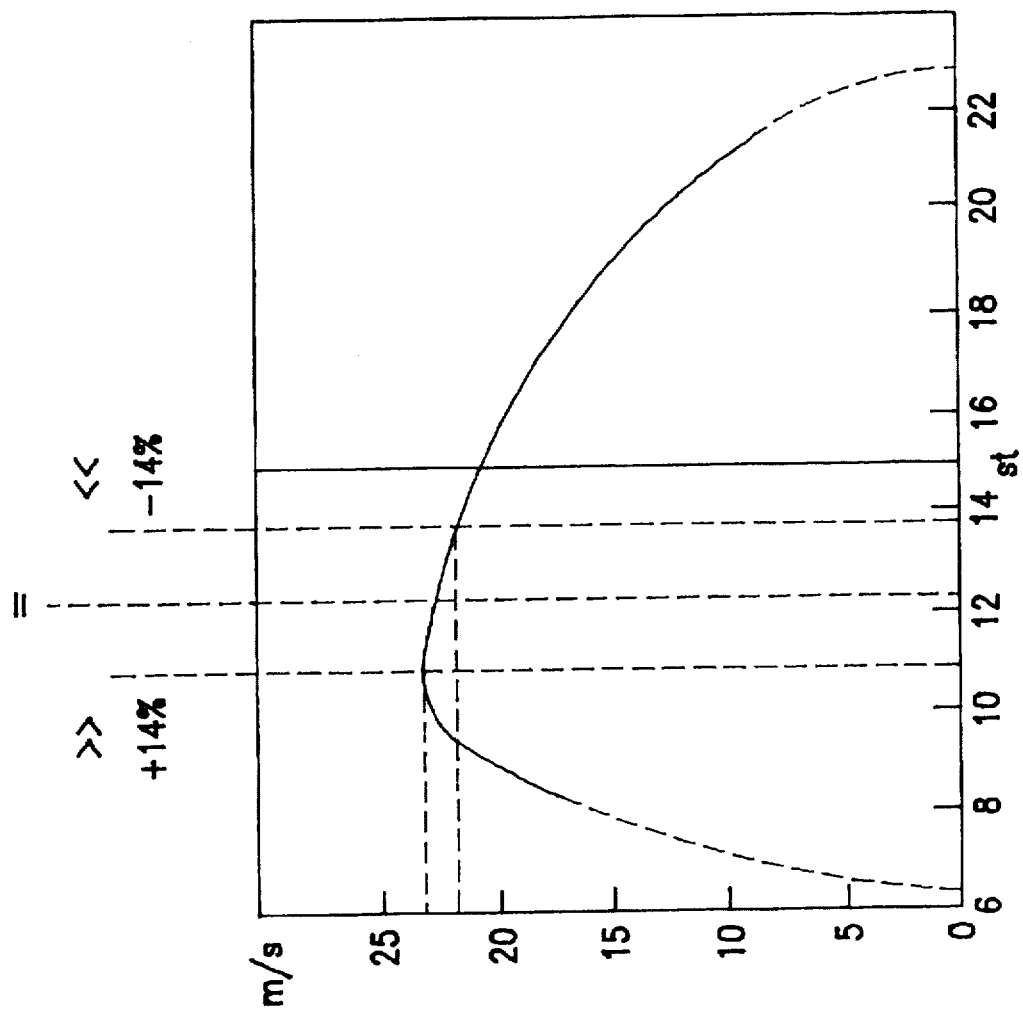
FIG. 5 contains a diagram of petrol combustion rate as a function of the air/petrol weight ratio of the mixture.

Under these conditions, swift acceleration and deceleration of the piston 4 can be achieved by increasing or decreasing the quantity of fuel, as explained, by up to 14% compared with the preceding cycle. Maintaining the mixture conditions inside the precombustion chamber 10 at all times to enable a combustion velocity that is as close as possible to the optimum (see FIG. 5), with the relative advantages of cycle configuration and its thermodynamic efficiency. If rich mixtures are used in the precombustion chamber 10 when the speed is varied, the effects on a generator as per the invention will be substantially diminished with regard to pollution. Combustion causes immediate, very rapid expansion with relative containment of the temperature of the mixture, which apart from anything else mixes with the very considerable volume of air contained in the cylinder 5 which is at a relatively low temperature under all operating conditions. As a guide, in an experimental prototype operative in steady-state with a maximum compression ratio $\rho=8.5$, a maximum cycle temperature of approximately 756° C. (1029° K.) and a discharge temperature of about 164° C. (437° K.) are obtained, with $(\lambda_v)=10$.

Under these conditions, production of toxic substances from combustion ($NO_x$, $CO$) of virtually zero can be obtained.

The combustion procedures described, which are made possible by using precombustion chamber 10, also enable the energy per cycle to be varied, keeping the compression stroke the same, or vice versa with no other adjustment and no negative effects. For a load which may vary, the quantity of fuel per cycle on compression may be varied to keep the stroke the same thereby adapting the energy produced each cycle to the loads current requirement.

Engineers in the field may determine the various characteristic operating curves, the geometric dimensions of the engine and parts of the generator, and the type of regulation connected with the type of load, as well as the percentage increase or decrease in the quantity of fuel per cycle to be provided in the various operating situations. Advantageously, a generator as per this invention, within its sphere of use, as the compression stroke increases, the effective voltage at the winding ends increases along similar curves at a level higher than the first. This also applies to the quantity of energy per cycle in the simplest case in which the load is purely ohmic. The above-mentioned single phase current produced by the generator can be rectified with diodes or modulated in other ways using a converter, depending on the user's requirements, thus enabling a direct supply to electric motors in a vehicle without the need for intermediate accumulator batteries.

To regulate operation of the internal combustion engine, the position of the end of the compression stroke of the piston 4 is recorded and fed into a central electronic unit (not shown). The electronic unit regulates the quantity of fuel admitted in one cycle by the injector nozzle 14 depending precisely on the position reached by the piston 4 in the preceding cycle, as stated, and/or on the load, increasing or reducing this as required, where necessary, by means of an increase or reduction command given, for example, by varying the angular or linear position of an accelerator pedal or another component fulfilling a similar function.

For an engine of a capacity of around 35 hp constructed with the parameters mentioned and with a variation in the quantity of fuel per cycle equivalent to the aforesaid 14%, a transition from minimum to maximum power output conditions is achieved in less than 2 seconds.

If the fuel admission is cut off completely, however, the pistons stop, after a very brief residual "inertia" stroke, in the position in which the compression resistance of gas contained in the cylinder 5 is equivalent and opposed to the resulting force of attraction between the moving magnets 3 and the other magnetized parts, or even those that are ferromagnetic only, connected to the fixed winding system 2.

The latter parts are not shown on the drawings, as they may very considerably in shape and arrangement depending on the designer's wishes.

To ensure correct operation of the generator, the ratio between the quantities of mechanical energy absorbed by the generator (equivalent to the quantities of electrical energy generated divided by the respective electromagnetic efficiency ratios) for operation with two different compression strokes in an internal combustion engine, should be substantially the same as the ratio between the two corresponding compression ratios multiplied by the ratio between the two overall outputs of the engine itself in relation to these compression ratios.

As a numerical example, consider two different strokes of a piston (and hence the associated magnets), two compression ratios are obtained equivalent to 8.5:1 and 3.6:1 and that the overall efficiency values of the internal combustion engineer are 0.46 and 0.30 respectively for these compression ratios.

To achieve the preset aims, the magnets and windings have to be dimensioned also according to the type of load, the electrical values of which may be controlled, such that the ratio between the quantities of energy consumed by the electromagnetic part of the generator in the two different relative cycles, i.e. during one compression stroke and one expansion stroke of the piston corresponding to the said compression ratios, is equivalent to $(8.5/3) (0.46/0.30)=3.6$. Thus, the mechanical energy consumed by the magnets in one cycle of movement corresponding to the compression ratio of 8.5 should be 3.6 times greater than that consumed in a cycle corresponding to the compression ratio 3.6.

This means that the two different quantities of fuel that can be mixed approximately stoichiometrically with two different mass amounts of air contained in the precombustion chamber in relation to the said compression ratios will supply exactly the right amount of energy, net of output, to move the magnets as electrical energy is generated.

If the load between the windings is purely ohmic, this can also be achieved solely by physically dimensioning and shaping the magnets and windings, as explained below, so that this fact occurs automatically for any compression stroke. Otherwise, the quantity of fuel per cycle and/or the electrical values relating to the load can be varied, as explained previously.

The internal efficiency of the actual functional part of the generator then determines the quantity of electrical energy actually generated by the various compression strokes of the internal combustion engine.

The above can be achieved physically, for example, by increasing the number of coils in the windings 2 either in linear mode or following other appropriate curves in the direction of penetration of the magnets 3 inside them (see arrow in FIG. 4); designing the shape of the magnets 3 accordingly; and/or varying the electrical values relating to the load.

Other systems are, however, available for an expert in the field, including the use of several magnets essentially parallelepiped in form and fixed windings (FIG. 4) arranged and dimensioned such that the electrical energy generated in one cycle in their relative movement for different strokes (which is the integral Vi dt in the cycle time), follows a curve that can be rectified in shape by letting it match with the curve of energy generated in one cycle of the internal combustion engine (net of output) by varying, for example, the thickness of the magnets, their width and or the air gap (T in FIG. 4) in the direction of travel. These variations do not necessarily have to be implemented. The designer may also decide to use magnets that are parallelepiped in shape, varying the part of the volume of air mixed in the precombustion chamber and/or the quantity of fuel used to saturate it such that the quantity of energy generated by the engine at any speed is the same as that used by the generator to produce electrical energy.

Figure 4:
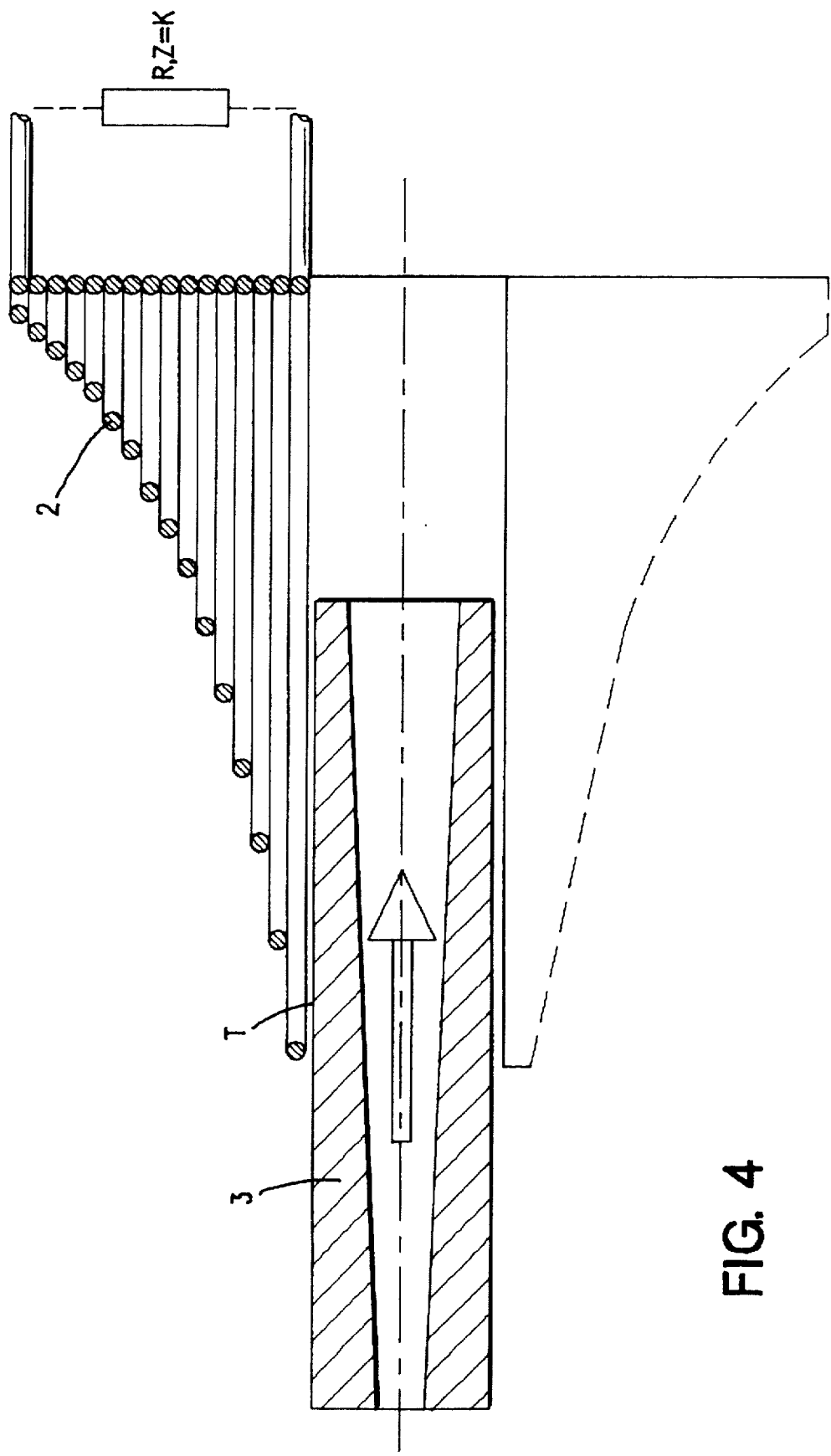
FIG. 4 contains a longitudinal section of a guide construction layout of the magnets and fixed windings.

This is particularly easy if the load is taken as purely ohmic and of constant value (FIG. 4).

The type of combustion obtainable with one precombustion chamber 10 operating as described, or preferably two precombustion chambers placed diametrically opposite and facing 110 (see FIG. 9), is more similar to that obtained with a burner rather than the conventional combustion with an internal combustion engine, and as stated, affords very low temperatures inside the cylinder, which together with the abundance of oxygen for completion of combustion, largely guarantees freedom from toxic products such as CO, HC and $NO_x$.

Figure 2:
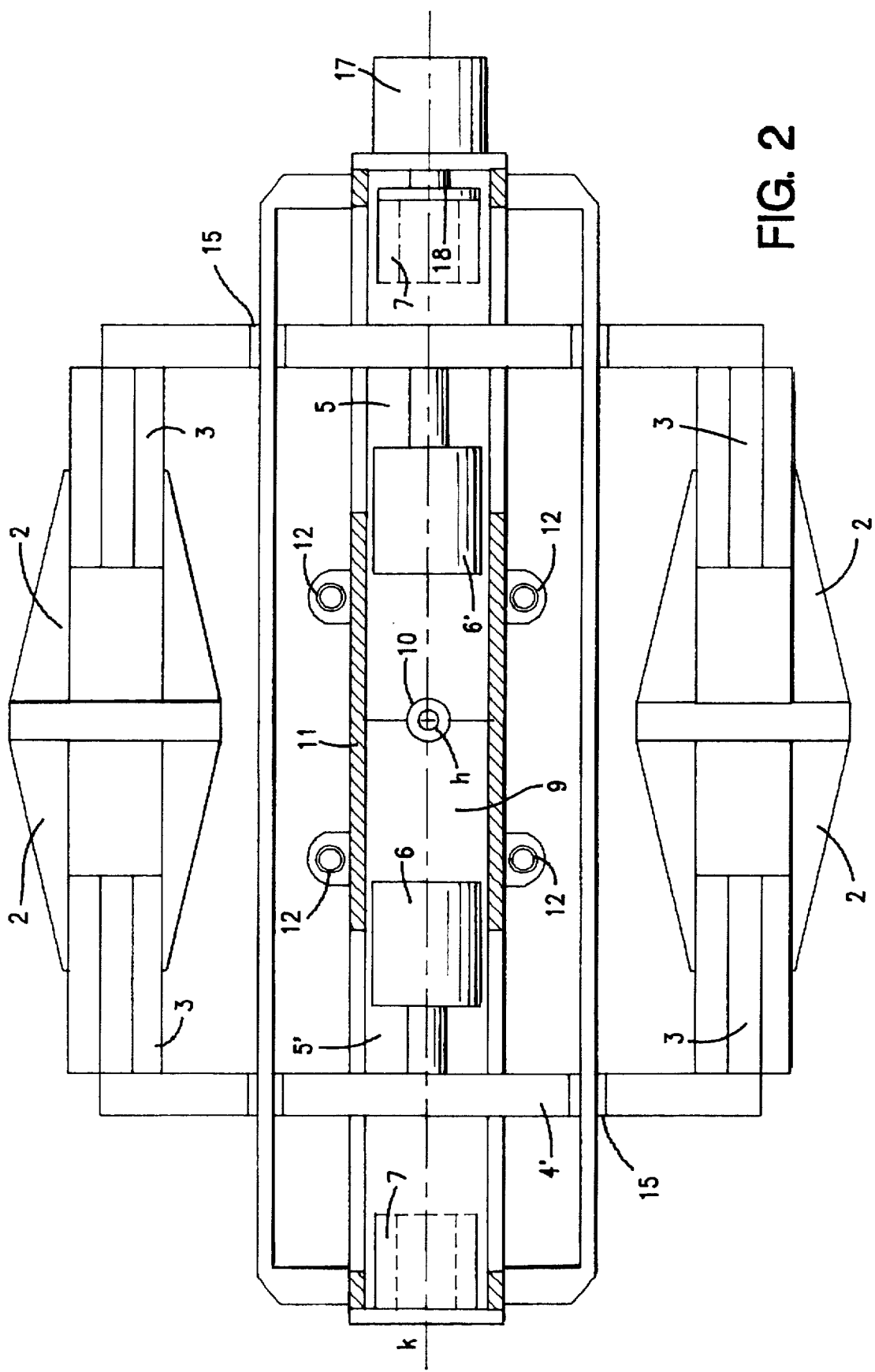
FIG. 2 is a longitudinal schematic section of another form of construction with two pistons facing each other and a single communal combustion chamber.
Figure 6:
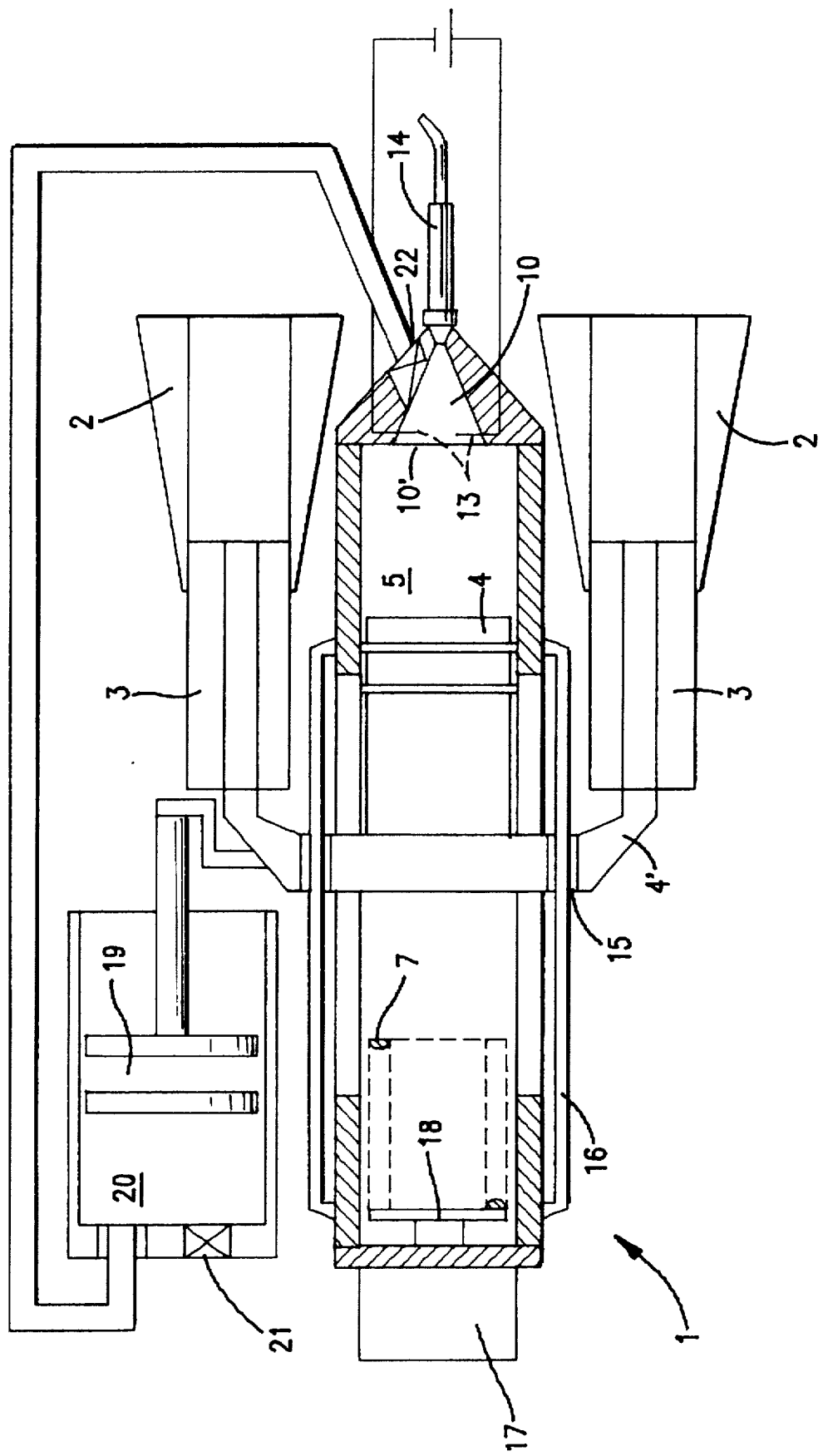
FIG. 6 shows longitudinal section of an example of construction with a single cylinder equipped with auxiliary pistons for scavenging.

The precombustion chambers shown in FIGS. 1, 2 and 6 are conical in shape with just one injector nozzle 14 provided on the apex, but it may sometimes be useful to use precombustion chambers that are, for example, sub-cylindrical or truncated cones in shape with an injector nozzle 111 set in a predetermined position perpendicular to the precombustion chamber axis (FIG. 9). If the cylinder 9 is connected by means of appropriate ducts 112 to the closed base 113 opposite that facing the cylinder 9, it is possible to saturate to the required extent just part of the total volume of air contained in the precombustion chamber.

A second injector nozzle 114 fitted to the said closed base 113 can be used for the initial starting cycle only. With this latter arrangement and the precombustion chambers facing, it is possible to completely eliminate any residual HC due to the very high turbulence generated by collision of the two volumes of mixture during their expansion and combustion. Other arrangements with one or more injectors are also possible.

The process described so far concerns cases in which the internal combustion engine is supplied with fuels with low ignition temperatures, such as petrol, alcohols or gaseous fuels. Diesel or similar fuels can also be used. For this, two injector nozzles in a single precombustion chamber (as in FIG. 9) are provided, with the first injecting petrol, for example, with appropriate time, just for the transitory engine starting period until an adequate compression ration is reached for self-ignition of the diesel, which is then injected by the second nozzle. This solution may be recommended in the case of high capacity static generators, in which the maximum output may predominate in importance with regard to the problem of particulate emission. Particulate emission may be limited by partially recycling exhaust gases, as described below.

With this type of operation, very low temperatures can be maintained compared with similar convention type engines.

As mentioned, the piston/magnet assembly can be supported in motion by, for example, two or more rolling friction bushings 15 which slide along the guide pins 16 (FIG. 1) or similar devices, to minimize friction. In this case, in view of the low temperatures reached, there is no need to provide for lubrication of any of the moving parts. No cooling system is required either, and it is in fact expedient to insulate the internal combustion engine so that its operation is adiabatic.

As the internal combustion engine is a two-stroke type, for each cycle, air needs to be introduced to refill and scavenge the cylinder or cylinders. One preferred embodiment achieves this by the movement of an auxiliary scavenging piston 19 in FIG. 6 which, when moving, is integral with the piston 4 of the engine, and which, during the compression stroke of the piston, draws in air inside the cylinder 20 which holds it by means of a one-way valve 21. During the expansion phase of the above piston 4, it compresses this air up to the moment when a second one-way valve 22 lets it enter the precombustion chamber 10 and relative cylinder 5, due to the drop in pressure occurring in the interim in the cylinder 5 of the engine.

With this system, scavenging efficiency values of a value approaching 0.90 can be achieved without any problem. More importantly, these are essentially constant for any compression stroke and hence any quantity of fuel per cycle.

The same result can be achieved with an auxiliary piston 19' in FIG. 9, which is integral with piston 6 and uses part of said cylinder 9 of the engine as an auxiliary cylinder 20', in accordance with the well-known method in the field of two-stroke engines with intrinsic scavenging. This solution as shown in FIG. 9 for the case of opposite pistons, is explained below.

As the effective expansion stroke of piston 4,6 of the engine is equivalent only to the corresponding length of the cylinder 5,9 whereas the compression stroke of the auxiliary piston 19,19' is equal to the sum of this length plus the compression stroke of the springs. By taking action at the design stage, a diameter can be chosen for the auxiliary piton 19,19'; larger, the same, or smaller than that of the engine piston depending on whether total or partial scavenging of the combustion gases is required for a given speed range. For example, in the prototype mentioned above, with an auxiliary piston 19 (FIG. 6) with the same diameter of engine piston 4, total scavenging takes place until there is a compression stroke corresponding to a compression ratio equivalent to 3.5:1, and partial scavenging with a decreasing quantity of air admitted in lower strokes, until scavenging is obtained equivalent to just 50% of the volume of the cylinder at the compression ratio taken as the minimum used, equivalent to 1.6:1. Partial recycling of combustion gases at the lower compression ratios serves, as found to an increasing extent as the latter reduce, to keep the temperatures and hence the duration of combustion high enough to avoid the formation of hydrocarbons in the exhaust gases in the transitory status of low compression on start-up of the generator 1.

For optimum operation, a cylinder temperature sensor and pressure measuring probe will be useful. The first of these being used to slightly vary the quantity of fuel admitted when the engine is cold (starter), and the second, again depending on the position of the piston at the end of compression, to change the predominance of the fuel injection pump in order to achieve efficient injection calibrated for all the operating statuses.

These components are not shown on the drawings as they are known and easily implemented by an expert in the field.

Figure 3:
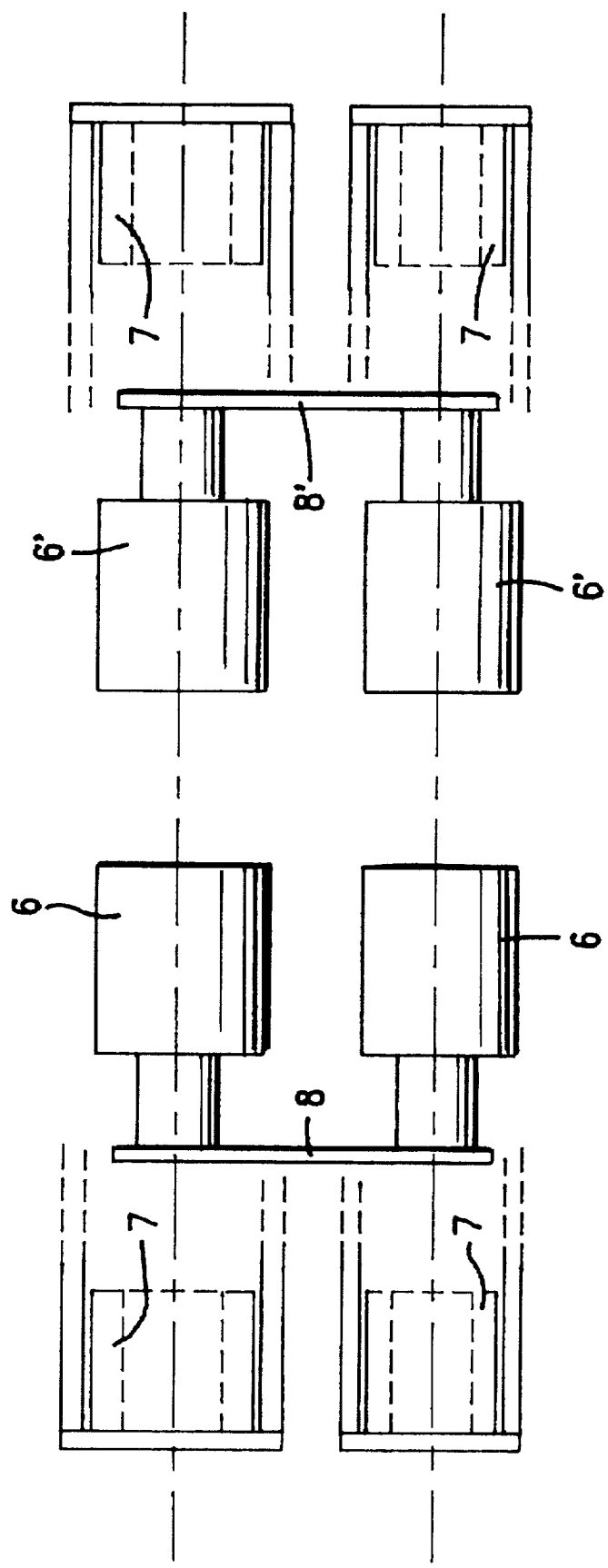
FIG. 3 shows a schematic plan view of a generator as per the invention equipped with four pistons in pairs integral with two combustion chambers.

To further simplify the construction of an autogenous generator as per the invention, and to eliminate restricting reactions and/or vibrations at the same time, it is expedient to use one or more pairs of pistons 6,6' facing each other, preferably with a single communal detonation chamber 9 (FIG. 2). In this case it is possible to have just one precombustion chamber 10 (or two precombustion chambers 111 facing each other as in FIG. 9) arranged centrally and with the longitudinal axis H perpendicular to the axis K of pistons 6,6'. To ensure perfect synchronization between several pairs of pistons when they are operative, pistons 6,6' may be made integral by means of connecting devices 8,8' (FIG. 3), these pistons operating in the same direction at a given moment in the cycle.

If components are then incorporated to return mechanical energy, i.e. the springs 7 in the case described, so that their position is adjustable in the direction of axis K of the movement of the pistons coupled to them, different amounts of electrical energy can be generated per cycle without varying the required frequency. Alternatively, the frequency can be varied using the same cycle corresponding to optimum efficiency, varying the length of stroke of the pistons and hence varying the time taken by these to do this. Implementation of continuous monitoring of the velocity and synchronization of the pistons also means that the piston stroke can be varied micro-metrically so that it can be maintained constant and perfectly synchronized. To achieve this last result, it is sufficient for just the position of the springs couple to one half of the pistons to be adjustable, i.e. those pistons which are connected integrally by means of the connection device 8 shown in FIG. 3.

Apparatus suitable for making the above adjustment can be in the form, for example, of a stepping motor or DC electric motor 17 connected by a system of screws and female threads acting as a linear repeater for a component 18 integral with the relative spring 7.

The invention also provides for a further means of preventing vibration due to momentary lack of synchronization between two facing pistons. By connecting the mechanical parts of the generator which acts as a support and locator for the springs 7 (in FIG. 2, these parts consist of the body 11 which forms the housing for cylinders 5 and 5') to earth or to a component supporting the generator by a connector 12 of predetermined limited elasticity in the direction of movement of pistons 6,6', there is no elastic yield in the connector 12, if the pistons are perfectly synchronized as the forces acting in opposite directions on two springs 7 connected to two facing pistons are equal with each other at all times. If, however, one of the two pistons moves in advance of the other, this will first exert force on the relative spring and then on the elastic connectors 12, which will extract part of the kinetic energy that should be stored by the spring and then return the relative piston, under the effects of elastic hysteresis due to compression of the springs.

This entails a deceleration in the piston return stroke and its gradual synchronization with the other (delayed) facing it. This correction of synchronization entails losses, albeit slight, in the overall energy balance, and it is thus advisable to use an electronic procedure as mentioned above, modifying the spring return position in order to ensure perfect initial synchronization.

Figure 7:
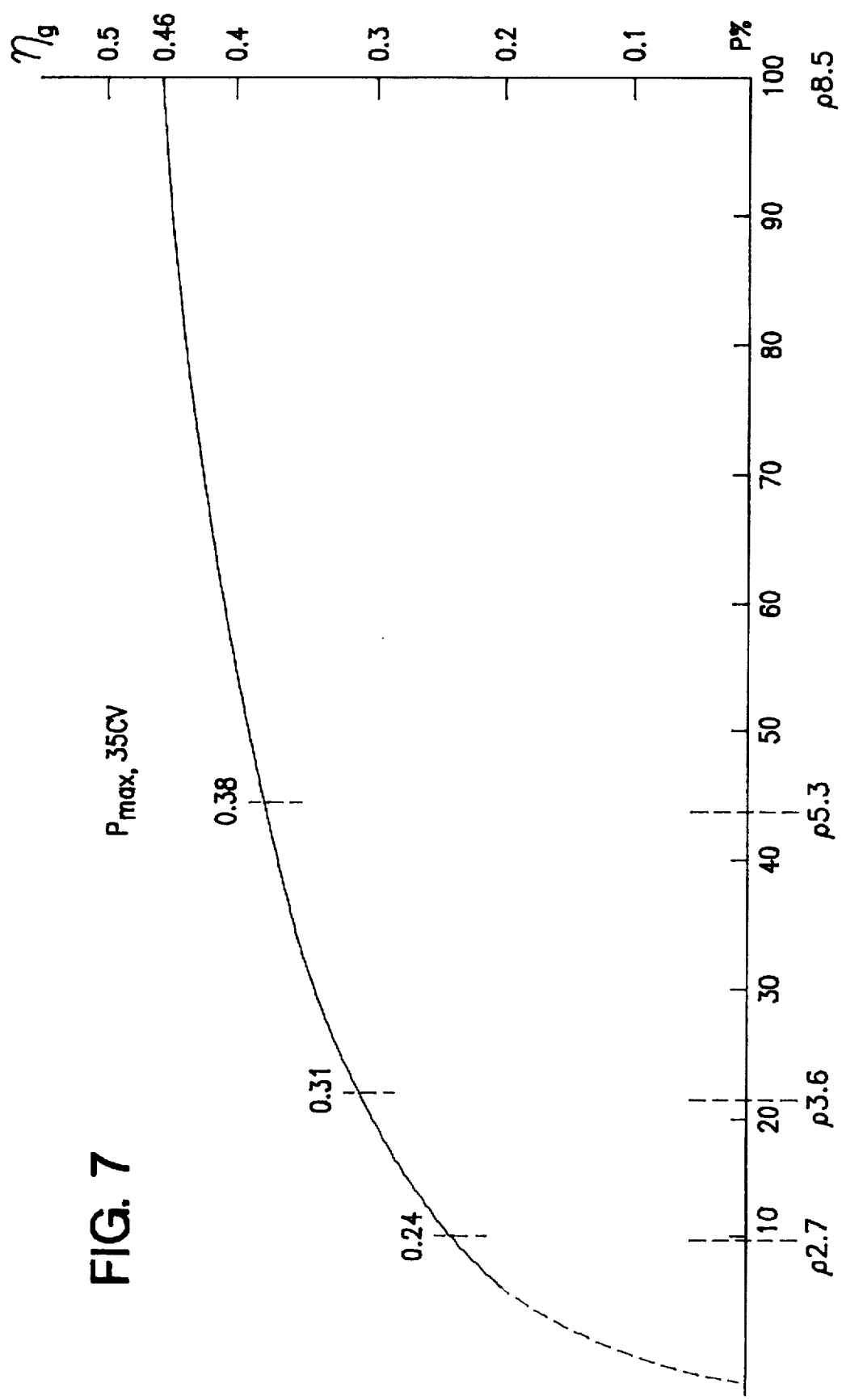
FIG. 7 is a curve of the overall efficiency of the internal combustion engine of a generator as per the invention.
Figure 8:
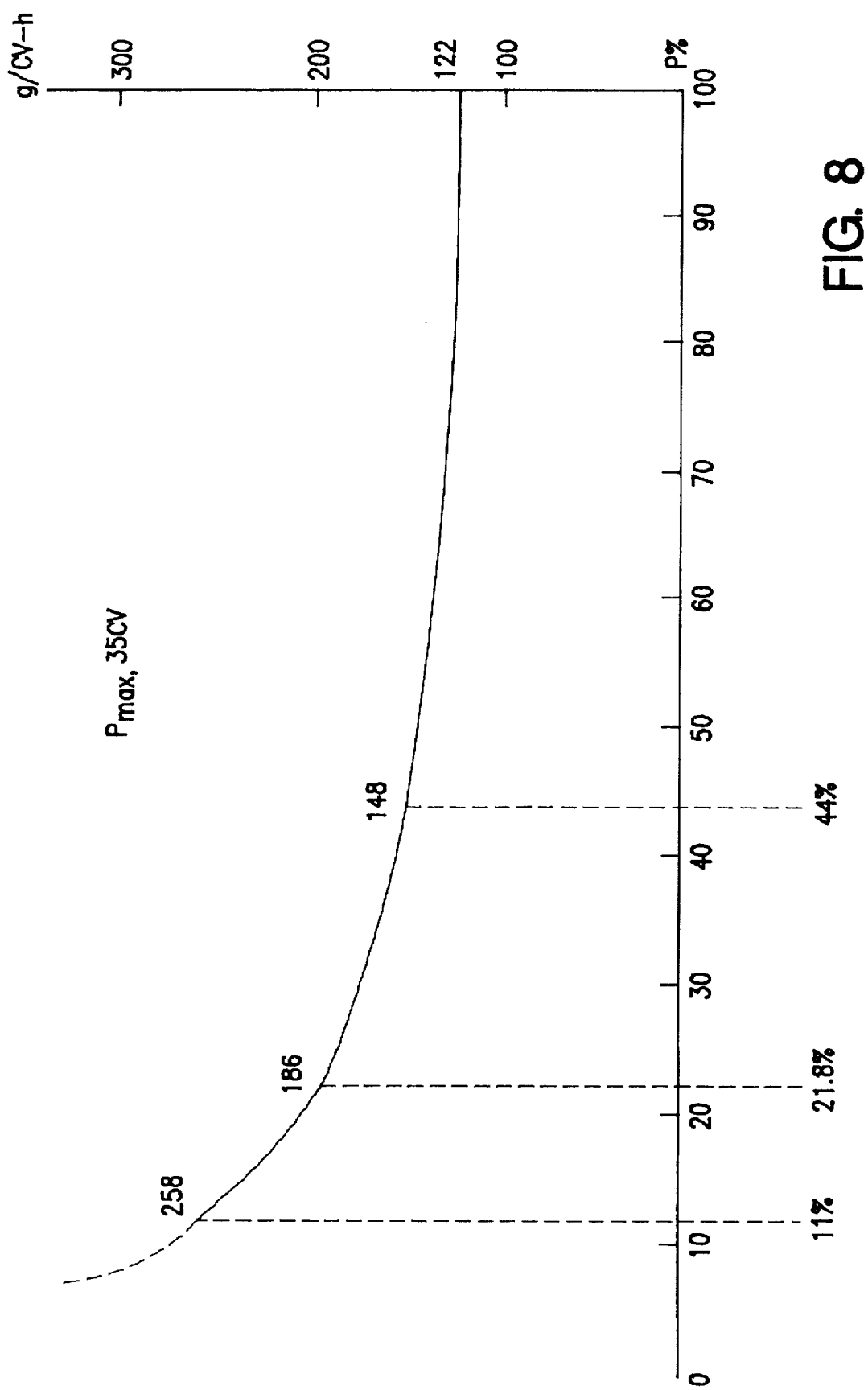
FIG. 8 is the curve of its specific consumption.

The overall efficiency diagrams (FIG. 7) of an internal combustion engine can be compared with the generator of the present invention and its specific consumption (FIG. 8). Overall efficiency has a value of about double that of a conventional engine at any speed.

All the component parts, their design and positioning and the regulation systems can be modified and improved in line with the know-how of a specialist in the field.

For example, instead of being supported by a fork 4', the magnets 2 in FIGS. 1 and 2 can be fixed to a cylindrical support provided on the same axis of the piston and integral with it, with parts arranged in a similar way to that already described for the Jarrett engine. This embodiment is not shown in the drawings.

The constructions described and illustrated are therefore preferred embodiments that are neither limitative or binding.

I claim:

1. An autogenous electrical generator comprising:

a two-stroke combustion engine adapted for variable stroke operation, having:

a piston in a piston cylinder, a precombustion chamber having a base opening toward said piston cylinder, defining a volume containing air and providing a volume for combusting an air/fuel mixture to cause said piston to complete an expansion stroke within said cylinder;

a mechanical energy return means positioned to receive kinetic energy from said piston during said expansion stroke and, on completion of said expansion stroke, enabling said piston to complete a compression stroke by imparting said received kinetic energy to said piston, wherein at the end of said compression stroke within said cylinder there remains a cylinder volume of air between said piston and said precombustion chamber;

fixed windings with connections for attachment to a load; and a permanent magnet mounted to move integrally with said piston and to interact by flux linkage with said fixed windings to develop a voltage across said connections and provide energy to said load, said precombustion chamber further comprising metered fuel injection means so as to ensure that, under any operating condition, at least part of said volume of air mixes with an at least stoichiometric quantity of fuel forming a mixture for said combustion, wherein said combustion of said mixture produces the energy required for enabling said piston to complete said expansion stroke within said cylinder, and said mixture during combustion expands into said cylinder volume of air into which no fuel has been injected and said combustion is completed, wherein said magnet and said fixed windings are dimensioned such that under steady-state operations, for a given air/fuel ratio and with said part of said volume of air remaining constant, the relationship between a first quantity of energy required to generate electrical energy for said load at a first expansion and compression stroke and a second quantity of energy required to generate electrical energy for said load at a second expansion and compression stroke is substantially equal to a first compression ratio obtained within said precombustion chamber while generating electrical energy at said first stroke over a second compression ratio obtained within said precombustion chamber while generating electrical energy at said second stroke times the overall efficiency of said engine at said first compression ratio over the overall efficiency of said engine at said second compression ratio.

2. The autogenous electrical generator of claim 1, further comprising a duct leading from said cylinder to said base of said precombustion chamber for providing said part of said volume of air.

3. The autogenous electrical generator of claim 1, wherein said magnet and said fixed windings are positioned such that said flux linkage is reduced as said expansion stroke progresses and said flux linkage increases as said compression stroke progresses.

4. The autogenous electrical generator of claim 1, further comprising:
an ohmic load of constant value connected to said connections, and
wherein the shape of said magnet and positioning of said magnet relative to said fixed windings establishes said relationship.

5. The autogenous electrical generator of claim 4, wherein said magnet is essentially parallelepiped having a thickness, width, and an air gap between said magnet and said fixed winding, and
wherein said magnet moving integrally with said piston generates electrical energy at plural different piston compression strokes that follows a curve substantially coincident with a curve of energy generated by said engine for said plural different piston compression strokes.

6. The autogenous electrical generator of claim 1, wherein said precombustion chamber is substantially conical in shape and further comprises a fuel injector nozzle at the apex of said precombustion chamber.

7. The autogenous electrical generator of claim 1, wherein said precombustion chamber is substantially a truncated cone in shape and further comprises
a duct running from said cylinder to said base;
a first fuel injector nozzle positioned axially on said base; and
a second fuel injector nozzle positioned perpendicular to the axis of said precombustion chamber.

8. The autogenous electrical generator of claim 1, further comprising:
an additional piston mounted facing said piston;
an additional fixed winding; and
an additional magnet mounted to move integrally with said piston and to interact with said additional fixed winding.

9. The autogenous electrical generator of claim 8, further comprising:
a third piston connected to said piston to cause said third piston and said piston to move in unison; and
a forth piston connected to said additional piston to cause said forth piston and said additional piston to move in unison.

10. The autogenous electrical generator of claim 8, further comprising a combustion chamber common to said piston and said additional piston,
wherein said precombustion chamber is mounted on an axis perpendicular to an axis formed in said combustion chamber between said piston and said additional piston.

11. The autogenous electrical generator of claim 10, further comprising an additional precombustion chamber, wherein said precombustion chamber and said additional precombustion chamber are mounted diametrically opposite each other.

12. The autogenous electrical generator of claim 8, wherein said mechanical energy return means further comprises an adjustment means adjusting the amount of energy returned to said piston.

13. The autogenous electrical generator of claim 8, wherein said mechanical energy return means further comprises an adjustment means for relocating said mechanical energy return means along the axis of movement of said piston.

14. The autogenous electrical generator of claim 1, wherein said mechanical energy return means further comprises a support connectable to an anchor having elasticity in the direction of movement of said piston.

15. The autogenous electrical generator of claim 1, further comprising:
an auxiliary scavenging piston having first and second single-way valves, said auxiliary scavenging piston moving integral with said piston, and drawing in air in a compression stroke of said piston via said first single-way, and expelling air via said second one-way valve to said precombustion chamber during an expansion stroke of said piston.

16. The autogenous electrical generator of claim 1, wherein under steady-state operation, said fuel injection means mixes said part of said volume of air with a quantity of fuel equivalent to 120 percent of a stoichiometric quantity.

17. An autogenous electrical generator with reduced emissions comprising:
a two-stroke combustion engine, having:
a piston in a piston cylinder;
a precombustion chamber having a conical shape, a base opening toward said piston cylinder, defining a volume containing air and providing a volume for combusting a air/fuel mixture to cause said piston to complete an expansion stroke within said cylinder; and
electrodes located within said precombustion chamber to combust said air/fuel mixture;
a mechanical energy return means positioned to receive kinetic energy from said piston during said expansion stroke and, on completion of said expansion stroke, enabling said piston to complete a compression stroke by imparting said received kinetic energy to said piston, wherein at the end of said compression stroke within said cylinder there remains a cylinder volume of air between said piston and said precombustion chamber;
metered fuel injection means so as to ensure that at least part of said volume of air mixes with an at least stoichiometric quantity of fuel forming a mixture for said combustion;
combustion control means combusting said mixture prior to any fuel entering said cylinder,
whereby said combustion of said mixture produces the energy required for enabling said piston to complete said expansion stroke within said cylinder, and said mixture during combustion expands into said cylinder volume of air into which no fuel has been injected and said combustion is completed with minimum toxic $NO_x$, CO combustion products.

18. An autogenous electrical generator of claim 17, further comprising:
fixed windings with connections for attachment to a load;
a permanent magnet mounted to move integrally with said piston and to interact by flux linkage with said fixed windings to develop a voltage across said connections and provide energy to said load; and
electrical energy control means responding to a change in said load by controlling said piston stroke length.

* * * * *